United States Patent
Wostbrock et al.

(10) Patent No.: US 7,001,490 B2
(45) Date of Patent: Feb. 21, 2006

(54) PURIFICATION OF AMMONIA BY DISTILLATION

(75) Inventors: Karl-Heinz Wostbrock, Mörstadt (DE); Gerd Kaibel, Lampertheim (DE); Christian Tragut, Wachenheim (DE); Gabriele Anken, Lambsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1030 days.

(21) Appl. No.: 09/767,820

(22) Filed: Jan. 24, 2001

(65) Prior Publication Data

US 2001/0010286 A1    Aug. 2, 2001

(30) Foreign Application Priority Data

Feb. 1, 2000    (DE)    ................. 100 04 311

(51) Int. Cl.
*B01D 3/14*    (2006.01)
*B01D 3/42*    (2006.01)
*C01C 1/02*    (2006.01)

(52) U.S. Cl. .................. 203/1; 196/111; 202/160; 202/154; 202/197; 203/2; 203/40; 203/99; 203/DIG. 19; 423/237

(58) Field of Classification Search .......... 203/99, 203/DIG. 19, 40, 1, 2; 423/235, 237; 202/197, 202/158, 160, 181, 154; 210/188, 739, 767; 196/111

See application file for complete search history.

(56) References Cited

U.S. PATENT DOCUMENTS

| | | | |
|---|---|---|---|
| 4,230,533 A | 10/1980 | Giroux | 203/1 |
| 5,100,634 A * | 3/1992 | Long | 423/235 |
| 5,498,317 A * | 3/1996 | Holiday | 202/154 |
| 6,254,735 B1 * | 7/2001 | Watzenberger | 203/26 |
| 6,482,297 B1 * | 11/2002 | Bocquenet et al. | 203/2 |

FOREIGN PATENT DOCUMENTS

| | | |
|---|---|---|
| DE | 33 02 525 | 7/1984 |
| DE | 33 14 395 | 10/1984 |
| DE | 33 27 352 | 2/1985 |
| DE | 35 22 234 | 1/1987 |
| EP | 780 147 | 6/1997 |
| WO | WO 96/39265 | 12/1996 |

OTHER PUBLICATIONS

Knott "Distallation's great leap forward" Process Engineering(1993) pp. 33-34.

* cited by examiner

*Primary Examiner*—Virginia Manoharan
(74) *Attorney, Agent, or Firm*—Novak Druce & Quigg, LLP

(57) ABSTRACT

Crude ammonia is separated into a low boiler fraction, a high boiler fraction and an intermediate-boiling pure fraction by continuous fractional distillation in a distillation apparatus configured either as a dividing wall column or as a system of thermally coupled distillation columns. In the process of the present invention, the low boiler fraction is taken off at the top of the distillation apparatus. The intermediate-boiling pure fraction is obtained at a side offtake which is preferably provided with droplet precipitators. In addition, the gas loading of the distillation column is restricted so that the operating pressure is in the range from 2 to 30 bar and the F factor does not exceed 2.0 $Pa^{0.5}$.

13 Claims, 4 Drawing Sheets

PURIFICATION OF AMMONIA BY DISTILLATION

The present invention relates to a process and a distillation apparatus for the continuously operated fractional distillation of crude ammonia.

Large amounts of pure ammonia, preferably containing less than 3 ppm of impurities, are required in industry. Such highly pure ammonia is needed, in particular, for the preparation of foodstuffs, for the calibration of analytical instruments and especially for semiconductor production. Crude ammonia as produced in the ammonia synthesis typically has an ammonia content of from about 99.0 to 99.5% by weight. Typical impurities are water, oil and inert gases, in particular methane, hydrogen, nitrogen and argon. Crude ammonia is unusable for the applications mentioned above.

WO 96/39265 describes a process for isolating pure ammonia, starting from crude ammonia. In this process, ammonia is firstly vaporized and subsequently purified by means of a complicated filtration process. The process is quite complicated and thus relatively unattractive from an economic point of view, especially for the production of relatively large quantities of pure ammonia.

In principle, pure ammonia can be isolated from crude ammonia purely by distillation. Here, ammonia has to be separated from low boilers (in particular methane, hydrogen, nitrogen and argon) and from high boilers (in particular water and oil): ammonia is thus the intermediate-boiling desired product. In the customary separation of intermediate-boiling desired products from low- an high-boiling impurities by distillation, various process variants are customary. In the simplest case, the feed mixture is separated into two fractions, namely a low-boiling top fraction and a high-boiling bottom fraction. When fractionating feed mixtures into more than two fractions, e.g. into low boilers, intermediate boilers and high boilers, this process variant requires the use of a plurality of distillation columns. In order to restrict the outlay in terms of apparatus, the fractionation of multicomponent mixtures consisting of more than two components is also carried out using columns which are suitable for taking off liquid or gaseous media at the side. However, the utility of distillation columns having side offtakes is greatly restricted by the fact that the products taken off at the side offtakes are normally not completely pure. Products taken off at the side in the enrichment section of a distillation column, which are usually taken off in liquid form, still contain proportions of lower-boiling components which are normally separated off at the top. The same applies to products taken off at the side in the stripping section, which are usually taken off in vapor form and which still contain proportions of the high boiler. When using such conventional side offtake columns, contaminated side products are virtually always obtained. The use of side offtake columns is therefore unsuitable for the isolation of pure substances and therefore for the isolation of pure ammonia. Thus, it is generally necessary to use column assemblies comprising at least two separate columns for, in particular, the isolation of intermediate-boiling pure substances from multicomponent mixtures. The use of such column assemblies for the isolation of pure ammonia from crude ammonia is relatively unattractive from an economic point of view for energy reasons and because of the high capital cost.

It is an object of the present invention to provide a process by means of which pure ammonia can be isolated, starting from crude ammonia. The purity of the product obtained should be so high that it is suitable for the abovementioned applications. The process should be able to be carried out in a practical and economical manner.

We have found that this object is achieved by a process for the continuously operated fractional distillation of crude ammonia to give a low boiler fraction, a high boiler fraction and an intermediate-boiling pure fraction in a distillation apparatus configured either as a dividing wall column or as a system of thermally coupled distillation columns, wherein the low boiler fraction is taken off at the top of the distillation apparatus, the intermediate-boiling pure fraction is obtained at a side offtake and the gas loading of the distillation column is restricted so that the operating pressure is in the range from 2 to 30 bar and the F factor does not exceed $2.0\ Pa^{0.5}$.

The F factor is a measure of the loading due to the gas stream in the column, and is thus a measure of the impulse of this gas (F factor: unit length per unit time multiplied by the root of the total density of the gas).

The operation of the distillation apparatus at a low F factor ensures the purity of the product obtained (the intermediate-boiling pure fraction). The F factor is determined from the product of the gas velocity in [m/s] and the square root of the gas density in [kg/m$^3$].

In a preferred embodiment, the intermediate-boiling pure fraction is obtained at a side offtake which is provided with droplet precipitators. For the purposes of the present invention, the expression "a side offtake provided with droplet precipitators" means that droplet precipitators are located in the region upstream of the side offtake in the distillation apparatus and/or in the side offtake itself, so that little or no liquid can leave the distillation apparatus in the form of droplets via the side offtake, namely "droplet entrainment" in the product taken from the distillation apparatus at the side offtake is prevented or restricted. If the distillation apparatus has a plurality of side offtakes, at least one side offtake is provided with droplet precipitators. In a preferred embodiment of the invention, the droplet precipitators are present in the form of demister packing.

The provision of the side offtake with droplet precipitators additionally promotes the purity of the product obtained (the intermediate-boiling pure fraction).

The low boiler fraction taken off at the top is generally taken off in gaseous form.

The process of the present invention makes it possible to obtain pure ammonia which is suitable for the abovementioned applications from crude ammonia. In addition, the process can be carried out industrially and is economically attractive due to low capital and energy costs. Dividing wall columns or thermally coupled distillation columns represent an advantageous alternative to the abovementioned distillation processes. The use of dividing wall columns makes it possible to isolate the intermediate-boiling pure fraction from crude ammonia. In dividing wall columns, a dividing wall is installed in the middle region. This extends above and below the feed point. On the other side, opposite the feed point, there is a side offtake. The dividing wall is located between the side offtake and the feed point. In the region of the column divided by the dividing wall, transverse mixing of liquid and vapor streams is not possible. This reduces the total number of distillation columns required for the fractionation of crude ammonia. A dividing wall column is in principle a simplification of thermally coupled distillation columns, but the latter have higher capital costs. Compared to an assembly of conventional distillation columns, dividing wall columns and thermally coupled columns offer advantages both in respect of energy consumption and in terms of capital costs. Information on dividing wall columns or thermally coupled distillation columns is given in EP-A 0 122 367, EP-B 0 126 288 and EP-B 0 133 510.

The operating pressure in the distillation apparatus is usually from 10 to 20 bar. The F factor generally does not exceed 1.5 $Pa^{0.5}$, preferably does not exceed 10.5 $Pa^{0.5}$. In a preferred embodiment of the invention, part of the intermediate-boiling pure fraction is taken off in liquid form and a further part of the intermediate-boiling pure fraction is taken off in gaseous form. The intermediate-boiling pure fraction taken off in gaseous form contains a particularly low proportion of ions. The crude ammonia usually contains from 97.0 to 99.9% by weight, preferably from 99.0 to 99.7% by weight, of ammonia and the intermediate-boiling pure fraction generally comprises at least 99.99% by weight, preferably at least 99.999% by weight, of ammonia. The intermediate-boiling pure fraction is generally taken off under level control, with the liquid level at the bottom of the column preferably being used as control parameter.

In addition, the invention provides a distillation apparatus configured either as a dividing wall column or as a system of thermally coupled distillation columns for carrying out the above-described process, wherein the low boiler fraction is taken off at the top of the distillation apparatus, the intermediate-boiling pure fraction is obtained at a side offtake and the gas loading of the distillation column is restricted so that the operating pressure is in the range from 2 to 30 bar and the F factor does not exceed 2.0 $Pa^{0.5}$.

In a preferred embodiment, the side offtake is provided with droplet precipitators. The low boiler fraction taken off at the top is generally taken off in gaseous form.

In the accompanying drawing.

Figure 1:
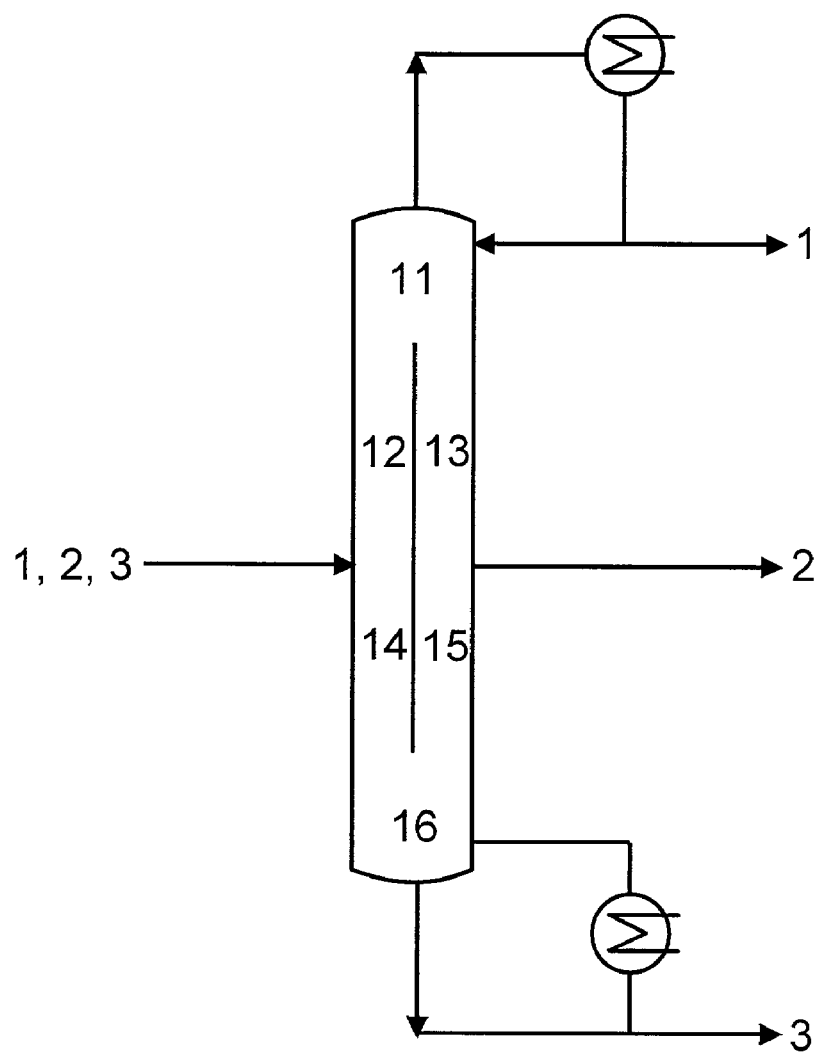
FIG. 1 shows a simplified diagram of a dividing wall column.
Figure 2:
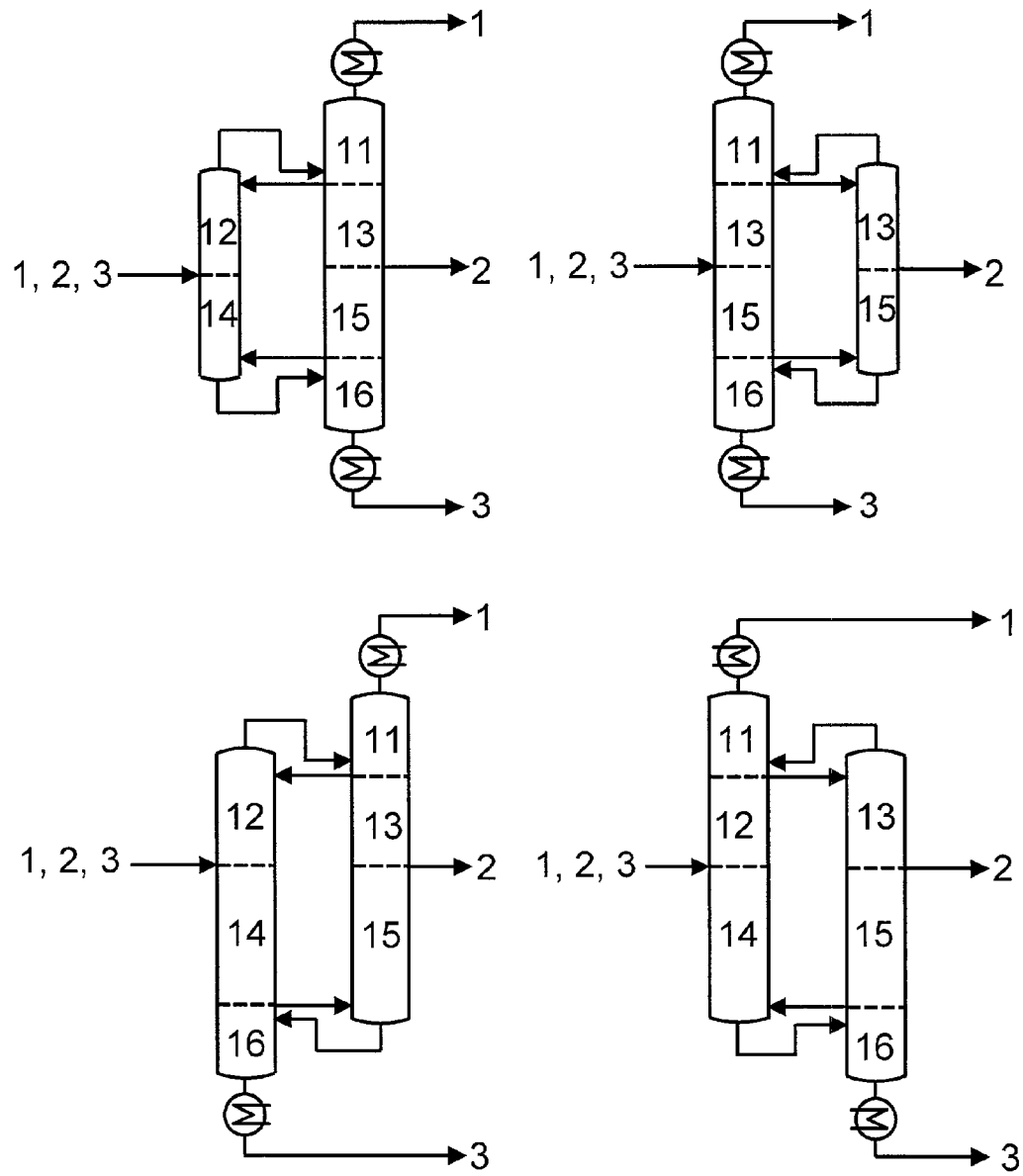
FIG. 2, FIG. 3 and FIG. 4 show simplified diagrams of systems of thermally coupled distillation columns.
Figure 3:
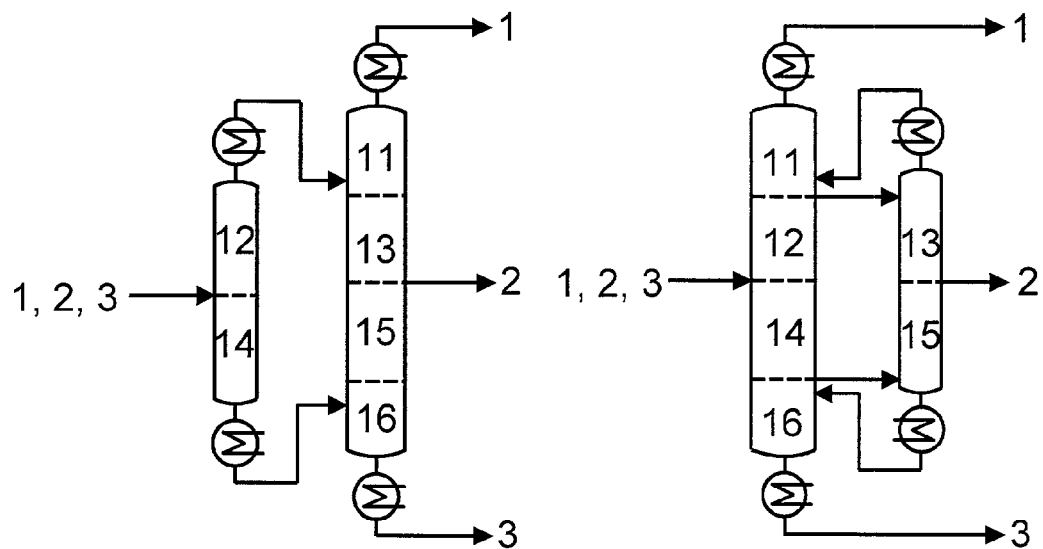
Figure 3:
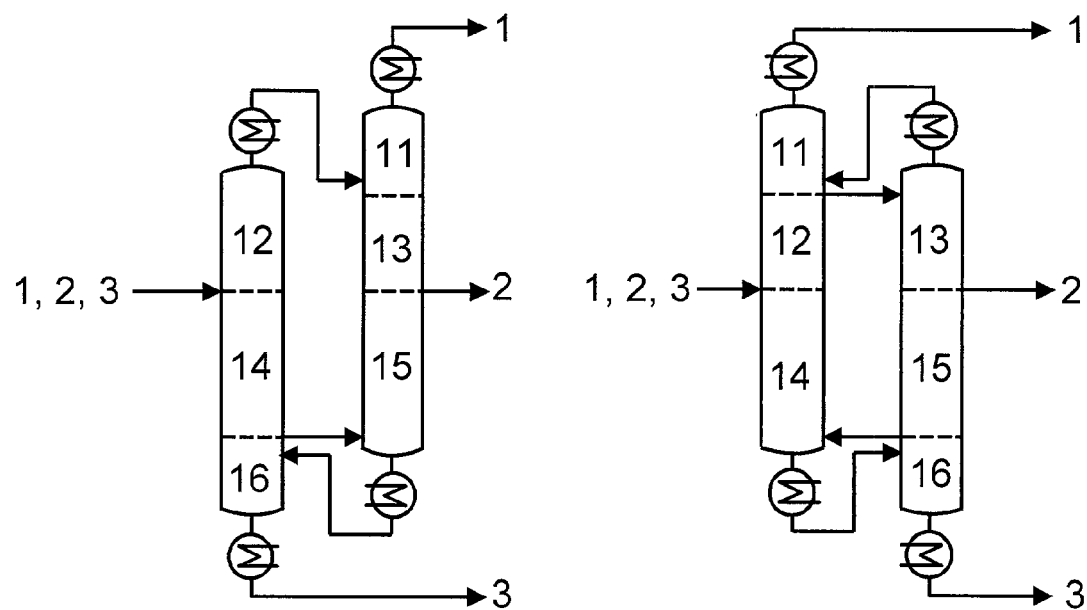
Figure 4:
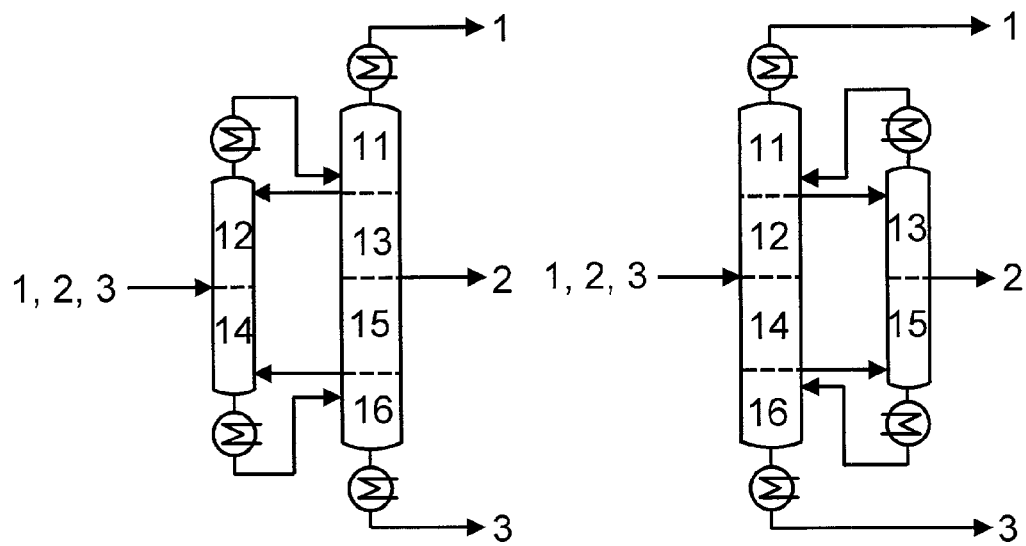
Figure 4:
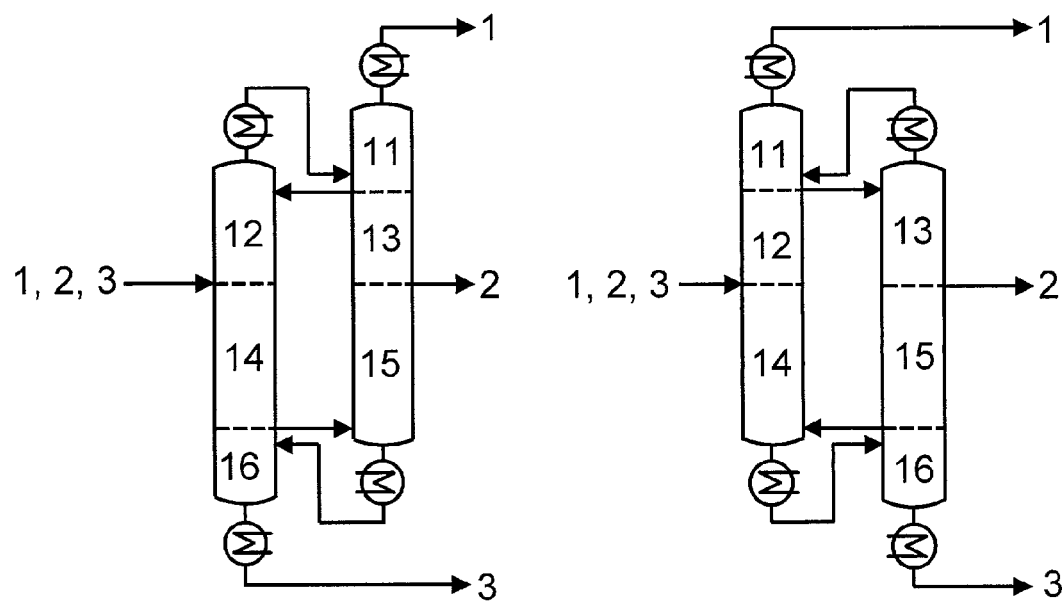

FIG. 1 to FIG. 4 show the fractionation of crude ammonia as multicomponent mixture. In the figures, 1 corresponds to the low boilers, 2 to the intermediate boilers corresponding to the intermediate-boiling pure fraction (i.e. pure ammonia) and 3 to the high boilers. The dividing wall column or thermally coupled column has a feed section 12, 14, an offtake section 13, 15, an upper column region 11 and a lower column region 16.

As described above, pure ammonia can be isolated via the side offtake, both in liquid form and in gaseous form. When it is taken off in liquid form, ammonia having a particularly low concentration of low boilers 1 is obtained. This makes it possible to prepare particularly pure liquid ammonia. Taking the ammonia off in gaseous form prevents traces of metal ions getting into the gaseous product.

Both when using dividing wall columns and when using thermally coupled columns, it can be advantageous to subject the feed stream to prevaporization and subsequently to introduce it into the column in the form of a two-phase (liquid and gas) stream or in the form of two streams (one gaseous and one liquid). The feed stream can thus be prevaporized either partially or fully. Such a prevaporization is particularly useful when the feed stream contains relatively large amounts of low boilers 1.

At the bottom of the distillation apparatus, high boilers, in particular water and oil, separate out together with some ammonia. The bottom product taken off is usually depressurized in a separator and thus freed of ammonia.

Dividing wall columns and thermally coupled columns can be configured either as packed columns containing random packing or ordered packing or as tray columns. In the process of the present invention, it is advisable, for cost reasons, to use trays, preferably valve trays or sieve trays, in the case of columns having a diameter of more than 1.2 m. The columns equipped in this way are preferably provided with demisters or other droplet precipitators in the region below the side offtake. When using divided wall columns, trays are generally only appropriate at a column diameter above about 2 m. If packed columns are used, ordered mesh packing having a specific surface area of from 300 to 800 $m^2/m^3$, preferably from 500 to 750 $m^2/m^3$, is particularly useful. In the case of these columns, too, the use of demisters or other droplet precipitators in the region of the side offtake is advisable.

Trays located in column regions next to the dividing wall are preferably arranged so that the dividing wall forms an angle of about 90° to the corresponding inflow and downflow shafts of the trays. Such an arrangement has the advantage that the dividing wall is used for stiffening the trays and the supports provided for supporting the trays can be made lighter. The supports are usually arranged parallel to the dividing wall to avoid premature flooding of the column.

The total number of theoretical plates is generally from about 20 to 60, preferably from 25 to 30.

The upper column region 11 of the distillation apparatus generally has from 5 to 30%, preferably from 10 to 25%, of the total number of theoretical plates of the distillation apparatus, while the enrichment section 12 of the feed section 12, 14 has from 5 to 50%, preferably from 25 to 40%, the stripping section 14 of the feed section 12, 14 has from 5 to 50%, preferably from 25 to 40%, the stripping section 15 of the offtake section 13, 15 has from 5 to 50%, preferably from 25 to 40%, the enrichment section 13 of the offtake section 13, 15 has from 5 to 50%, preferably from 25 to 40%, and the lower column region 16 has from 5 to 30%, preferably from 10 to 25%, of the total number of theoretical plates. The sum of the numbers of theoretical plates of the subregions 12 and 14 of the feed section 12, 14 is usually from 80 to 120%, preferably from 90 to 110%, of the sum of the numbers of theoretical plates of the subregions 13 and 15 in the offtake section 13, 15.

In a preferred embodiment of the invention, the dividing wall column has sampling facilities at the upper and lower ends of the dividing wall. By means of these, liquid or gaseous samples can be taken from the column continuously or at intervals and analyzed in respect of their composition.

Various control strategies are generally described for regulating dividing wall columns and thermally coupled columns. Corresponding descriptions may be found in U.S. Pat. No. 4,230,533, DE-C 35 22 234, EP-A 0 780 147 and the journal "Process Engineering", 2 (1993), 33–34.

A control concept different from these has been found to be particularly useful for regulating the process of the present invention. This is designed, in particular, so that the pressure and the temperature in the entire interior region of the distillation apparatus of the present invention vary only slightly. Essential aspects of the control concept are:

a flow control for the fraction taken off at the top of the distillation apparatus, utilizing the amount of cooling water to the corresponding condenser located at the top of the column as setting parameter (the flow of the fraction taken off at the top is regulated);

a temperature control in the lower column region 16, which utilizes the amount of fraction taken off at the bottom as setting parameter; the bottom product is thus taken off under temperature control and the control temperature used is a temperature which is recorded by a measurement point either in the lower column region 16 or at the bottom;

a level control in the bottom of the column, which utilizes the amount taken off at the side as setting parameter;

a control for the differential pressure over the column, utilizing the amount of heating steam or the heating steam pressure of the bottom vaporizer of the distillation apparatus as setting parameter.

In general, the liquid is conveyed to the feed section 12, 14 by means of a pump or by means of a static feed height of at least about 1 m under flow control. The control is preferably set so that the amount of liquid fed into the feed section cannot drop below 30% of the "normal value" (for the present purposes, the normal value is the amount which, averaged over time, is obtained per unit time at a particular point in the corresponding continuous process). The division of the liquid flowing down from the subregion 13 in the offtake section 13, 15 to the side offtake and to the subregion 15 in the offtake section 13, 15 is preferably set by means of a regulator so that the amount of liquid flowing into the subregion 15 cannot drop below 30% of the "normal value".

When multicomponent mixtures are separated into low boiler, intermediate boiler and high boiler fractions, there are usually specifications in respect of the permissible proportion of low boilers 1 and high boilers 3 in the intermediate boiler fraction. Here, it is possible either for individual critical components, referred to as key components, to be specified or for the sum of a plurality of key components to be specified. Adherence to this specification for the high boilers 3 in the intermediate boiler fraction (i.e. in the intermediate-boiling pure fraction) is preferably regulated via the division ratio of the liquid at the upper end of the dividing wall.

In general, the liquid flowing down from the upper column region 11 is collected in a collection space located in the column or outside the column and is divided in a targeted way by means of a fixed setting or control at the upper end of the dividing wall in such a way that the ratio of the liquid flow to the feed section 12, 14 to the flow to the offtake section 13, 15 is from 0.1 to 1.0, preferably from 0.6 to 0.9. The amount of vapor is usually set at the lower end of the dividing wall by choice of separation internals and/or the additional installation of internals generating a pressure drop, for example orifice plates, in such a way that the ratio of the vapor flow into the feed section 12, 14 to the flow into the offtake section 13, 15 is from 0.8 to 1.2, preferably from 0.9 to 1.1.

The specification for the low boilers 1 in the intermediate-boiling pure fraction is preferably regulated by means of the heating power.

For taking off and dividing the liquids at the upper end of the dividing wall and at the side offtake, both internal collection spaces for the liquid and collection spaces located outside the column are suitable, and these perform the function of a pump reservoir. In the case of tray columns, it is particularly useful to achieve this by enlarging the downflow shaft to about 2 to 3 times the customary height and storing the appropriate amount of liquid in the downflow shaft. When using packed columns, the liquid is first collected in collectors and from there conveyed to an internal or external collection space. In the case of relatively small liquid throughputs up to 10 m³/h, pivoting funnels offer an inexpensive alternative.

According to the present invention, an assembly of two connected distillation columns which are coupled thermally, namely a system of thermally coupled distillation columns, can also be used in place of a dividing wall column. In general, both of the thermally coupled distillation columns are each provided with their own vaporizer and a condenser. If appropriate distillation columns are available, a system of thermally coupled distillation columns can offer a sensible alternative to dividing wall columns. It is useful to select forms of connection which make it possible for exclusively liquid connecting flows to occur between the individual distillation columns. The specific arrangements offer the advantage that the two distillation columns can be operated under different pressures, with the advantage that they can be more readily matched to the temperature level of existing heating and cooling media.

We claim:

1. A process for the continuously operated fractional distillation of crude ammonia to give a low boiler fraction, a high boiler fraction and an intermediate-boiling pure fraction in a distillation apparatus configured either as a dividing wall column or as a system of thermally coupled distillation columns, wherein the low boiler fraction is taken off at the top of the distillation apparatus, the intermediate-boiling pure fraction is obtained at a side offtake and the gas loading of the distillation column is restricted so that the operating pressure is in the range from 2 to 30 bar and the measure of the loading due to the gas stream in the column, as defined by unit length per unit time multiplied by the root of the total density of the gas, does not exceed 2.0 $Pa^{0.5}$.

2. A process as claimed in claim 1, wherein the operating pressure is in the range from 10 to 20 bar.

3. A process as claimed in claim 1, wherein the measure of the loading due to the gas stream in the column does not exceed 1.5 $Pa^{0.5}$.

4. A process as claimed in claim 3, wherein the measure of the loading due to the gas stream in the column does not exceed 1.0 $Pa^{0.5}$.

5. A process as claimed in claim 1, wherein the intermediate-boiling pure fraction is obtained at a side offtake which is provided with droplet precipitators.

6. A process as claimed in claim 5, wherein the droplet precipitators are present in the form of demister packing.

7. A process as claimed in claim 1, wherein part of the intermediate-boiling pure fraction is taken off in liquid form and a further part of the intermediate-boiling pure fraction is taken off in gaseous form.

8. A process as claimed in claim 1, wherein the crude ammonia contains from 95.0 to 99.9% by weight of ammonia and the intermediate-boiling pure fraction comprises at least 99.99% by weight of ammonia.

9. A process as claimed in claim 8, wherein the crude ammonia contains from 99.0 to 99.7% by weight of ammonia.

10. A process as claimed in claim 8, wherein the intermediate-boiling pure fraction comprises at least 99.999% by weight of ammonia.

11. A process as claimed in claim 1, wherein the intermediate-boiling pure fraction is taken off under level control and the control parameter used is preferably the liquid level at the bottom of the column.

12. A distillation apparatus configured either as a dividing wall column or as a system of thermally coupled distillation columns for carrying out a process for the continuously operated fractional distillation of crude ammonia to give a low boiler fraction, a high boiler fraction and an intermediate-boiling pure fraction wherein the low boiler fraction is taken off at the top of the distillation apparatus, the intermediate-boiling pure fraction is obtained at a side offtake which is provided with droplet precipitators and the gas loading of the distillation column is restricted so that the operating pressure is in the range from 2 to 30 bar and the measure of the loading due to the gas stream in the column as defined by unit length per unit time multiplied by the root of the total density of the gas, does not exceed 2.0 $Pa^{0.5}$.

13. A distillation apparatus as claimed in claim 12, wherein the droplet precipitators are present in the form of demister packing.

* * * * *